US007822528B2

(12) United States Patent
Whitney et al.

(10) Patent No.: US 7,822,528 B2
(45) Date of Patent: Oct. 26, 2010

(54) FULL RANGE TORQUE REDUCTION

(75) Inventors: Christopher E. Whitney, Highland, MI (US); Richard B. Jess, Haslett, MI (US); Jeffrey M. Kaiser, Highland, MI (US); Weixin Yan, Novi, MI (US); Michael Livshiz, Ann Arbor, MI (US); Robert C. Simon, Jr., Brighton, MI (US); Leonard G. Wozniak, Ann Arbor, MI (US)

(73) Assignee: GM Global Technology Operations, Inc.

( * ) Notice: Subject to any disclaimer, the term of this patent is extended or adjusted under 35 U.S.C. 154(b) by 450 days.

(21) Appl. No.: 12/027,482

(22) Filed: Feb. 7, 2008

(65) Prior Publication Data

US 2008/0243355 A1 Oct. 2, 2008

Related U.S. Application Data

(60) Provisional application No. 60/985,477, filed on Nov. 5, 2007, provisional application No. 60/919,995, filed on Mar. 26, 2007.

(51) Int. Cl.
*G06F 19/00* (2006.01)

(52) U.S. Cl. .............. 701/102; 123/406.23; 123/406.19

(58) Field of Classification Search ................. 701/102, 701/110, 84, 103, 51, 54, 101, 108; 73/114.15; 123/559.1, 434, 352, 361, 90.15, 90.17, 399, 123/347, 348, 350, 406.23, 349; 477/115, 477/106, 107, 109, 110; 60/605.1, 600, 601; *G06F 19/00*
See application file for complete search history.

(56) References Cited

U.S. PATENT DOCUMENTS

| | | | | |
|---|---|---|---|---|
| 4,915,076 | A * | 4/1990 | Takizawa | 123/406.19 |
| 6,704,638 | B2 * | 3/2004 | Livshiz et al. | 701/102 |
| 7,395,147 | B2 * | 7/2008 | Livshiz et al. | 701/103 |

* cited by examiner

*Primary Examiner*—Michael Cuff
*Assistant Examiner*—Keith Coleman

(57) ABSTRACT

An engine control system comprises a torque request module, an immediate torque control module, an actuation module, and an expected torque control module. The torque request module generates an expected torque request and an immediate torque request. The immediate torque control module controls a spark advance of an engine based on the immediate torque request. The actuation module selectively reduces the expected torque request based on the immediate torque request and a spark capacity. The spark capacity is based on a difference between a first engine torque and a second engine torque, determined at a current airflow. The first engine torque is determined at a first spark advance and the second engine torque is determined at a second spark advance that is less than the first spark advance. The expected torque control module that controls a throttle valve area based on the expected torque request.

20 Claims, 4 Drawing Sheets

FULL RANGE TORQUE REDUCTION

CROSS-REFERENCE TO RELATED APPLICATIONS

This application claims the benefit of U.S. Provisional Application Nos. 60/985,477, filed on Nov. 5, 2007 and 60/919,995, filed on Mar. 26, 2007. The disclosures of the above applications are incorporated herein by reference in its entirety.

FIELD

The present disclosure relates to controlling torque in an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a torque request module, an immediate torque control module, an actuation module, and an expected torque control module. The torque request module generates an expected torque request and an immediate torque request. The immediate torque control module controls a spark advance of an engine based on the immediate torque request. The actuation module selectively reduces the expected torque request based on the immediate torque request and a spark capacity. The spark capacity is based on a difference between a first engine torque and a second engine torque, determined at a current airflow. The first engine torque is determined at a first spark advance and the second engine torque is determined at a second spark advance that is less than the first spark advance. The expected torque control module that controls a throttle valve area based on the expected torque request.

In other features, the actuation module reduces the expected torque request when the immediate torque request is less than the second engine torque. The actuation module reduces the expected torque request to a value based on a sum of the immediate torque request and the spark reserve capacity. The actuation module reduces the expected torque request to a value based on a sum of the immediate torque request, the spark reserve capacity, and a predetermined negative offset.

In further features, the actuation module updates the expected torque request based on changes in the spark capacity. The actuation module updates the expected torque request based on a stabilized capacity based on the spark capacity. The stabilized capacity is determined by rate limiting the spark capacity. The actuation module reduces the expected torque request to a value based on a sum of the spark reserve capacity and a filtered torque target.

In still other features, the filtered torque target is based on the immediate torque request. The filtered torque target is determined by low-pass filtering the immediate torque request. The filtered torque target is set equal to the immediate torque request when the immediate torque request is at least one of greater than the first engine torque and less than the second engine torque.

A method of controlling an engine control system comprises generating an expected torque request and an immediate torque request; controlling a spark advance of an engine based on the immediate torque request; determining first and second engine torques at a current airflow level, where the first engine torque is determined at a first spark advance and the second engine torque is determined at a second spark advance that is less than the first spark advance; determining a spark capacity based on a difference between the first and second engine torques; selectively reducing the expected torque request based on the immediate torque request and the spark capacity; and controlling a throttle valve area based on the expected torque request.

In other features, the method further comprises reducing the expected torque request when the immediate torque request is less than the second engine torque. The method further comprises reducing the expected torque request to a value based on a sum of the immediate torque request and the spark reserve capacity. The method further comprises reducing the expected torque request to a value based on a sum of the immediate torque request, the spark reserve capacity, and a predetermined negative offset.

In further features, the method further comprises updating the expected torque request based on changes in the spark capacity. The method further comprises updating the expected torque request based on a stabilized capacity based on the spark capacity. The method further comprises determining the stabilized capacity by rate limiting the spark capacity. The method further comprises determining a filtered torque target is based on the immediate torque request; and reducing the expected torque request to a value based on a sum of the spark reserve capacity and the filtered torque target.

In still other features, the method further comprises determining the filtered torque target by low-pass filtering the immediate torque request. The method further comprises setting the filtered torque target equal to the immediate torque request when the immediate torque request is at least one of greater than the first engine torque and less than the second engine torque.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
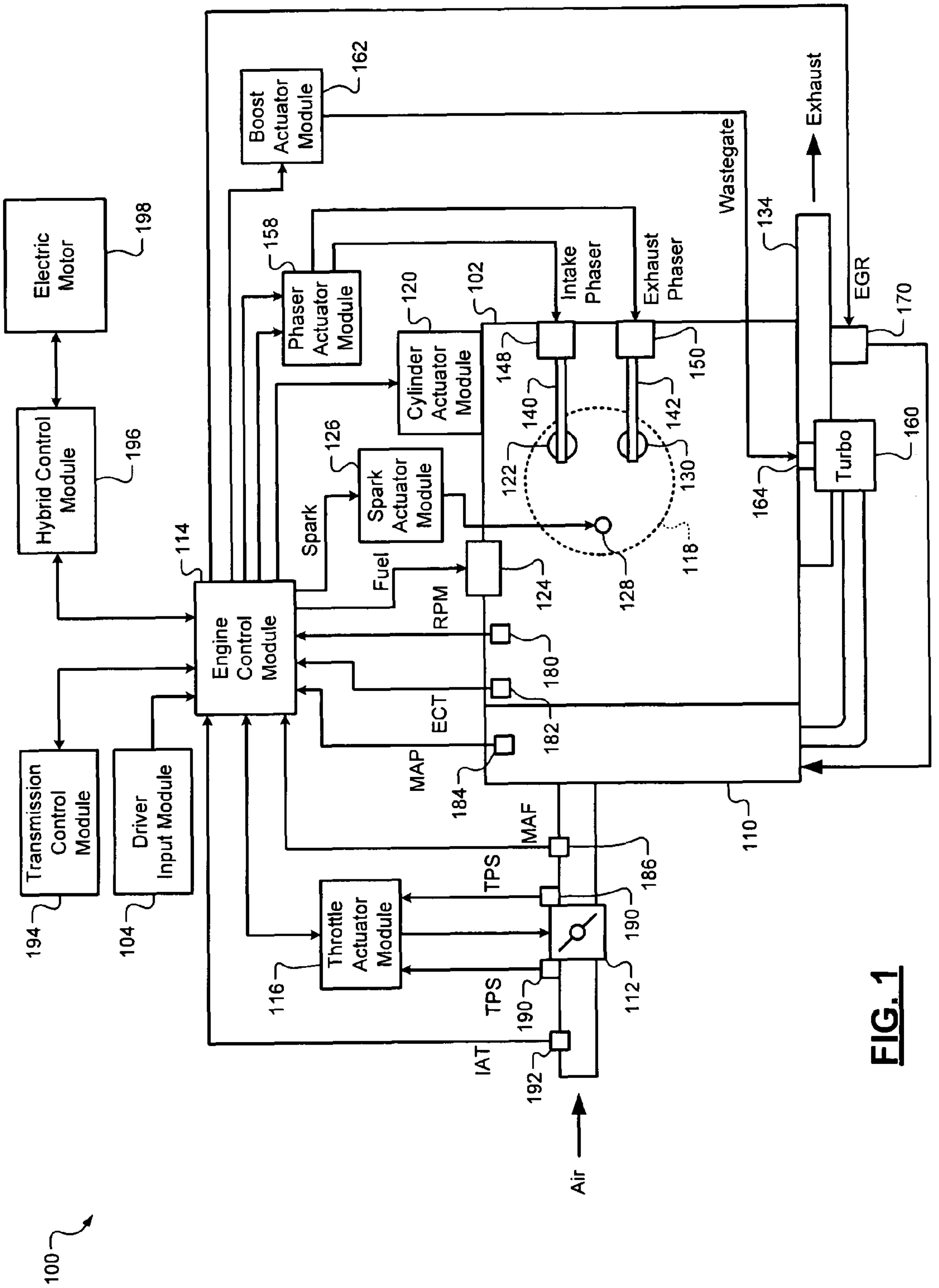
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the representative cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is generated when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Figure 2:
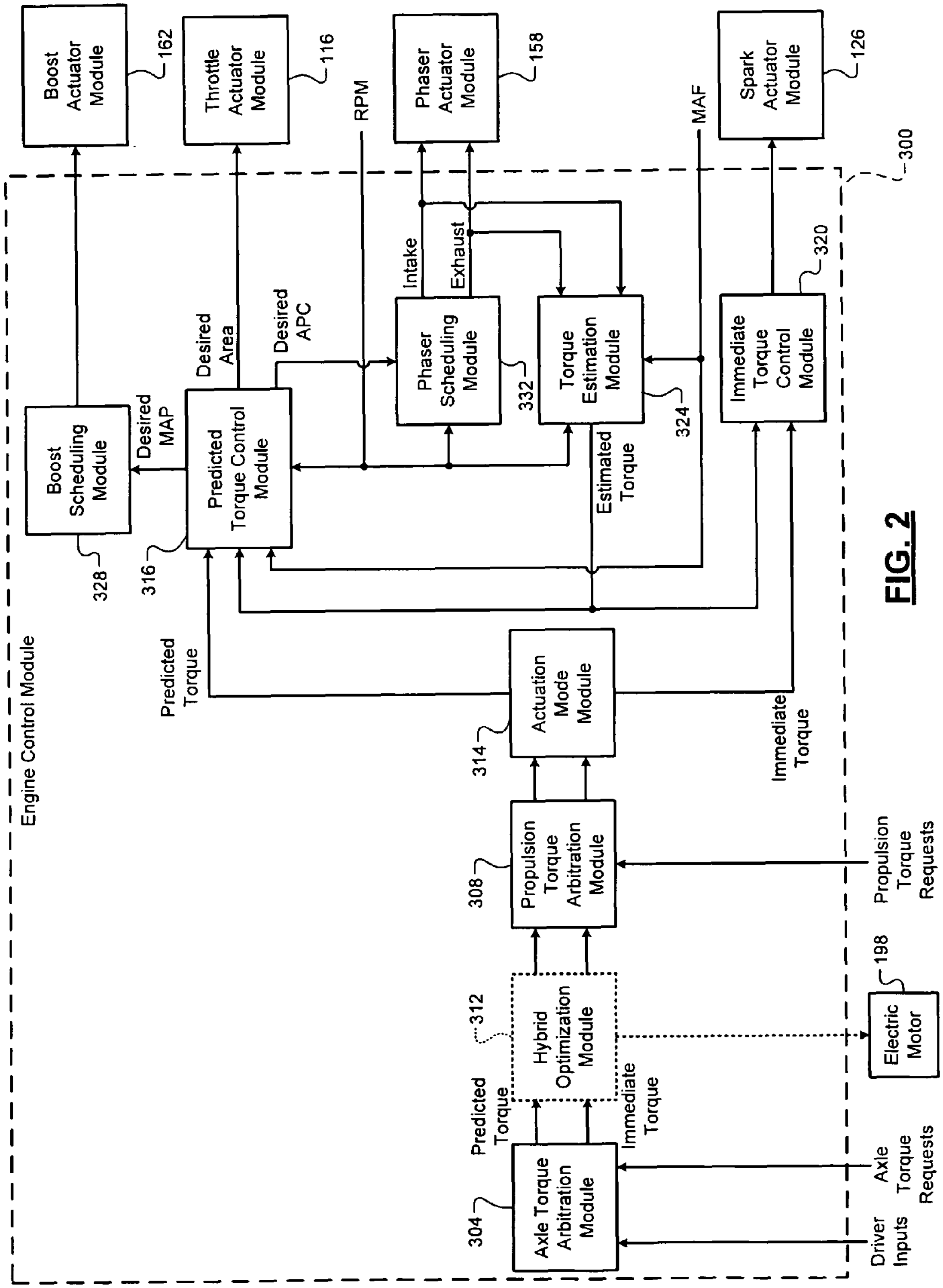
FIG. 2 is a functional block diagram of an exemplary engine control system according to the principles of the present disclosure.

Referring now to FIG. 2, a functional block diagram of an exemplary engine control system is presented. An engine control module (ECM) 300 includes an axle torque arbitration module 304. The axle torque arbitration module 304 arbitrates between driver inputs from the driver input module 104 and other axle torque requests. For example, driver inputs may include accelerator pedal position. Other axle torque requests may include torque reduction requested during a gear shift by the transmission control module 194, torque reduction requested during wheel slip by a traction control system, and torque requests to control speed from a cruise control system.

The axle torque arbitration module 304 outputs a predicted torque and an immediate torque. The predicted torque is the amount of torque that will be required in the future to meet the driver's torque and/or speed requests. The immediate torque is the torque required at the present moment to meet temporary torque requests, such as torque reductions when shifting gears or when traction control senses wheel slippage.

The immediate torque may be achieved by engine actuators that respond quickly, while slower engine actuators are targeted to achieve the predicted torque. For example, a spark actuator may be able to quickly change spark advance, while cam phaser or throttle actuators may be slower to respond. The axle torque arbitration module 304 outputs the predicted torque and the immediate torque to a propulsion torque arbitration module 308.

In various implementations, the axle torque arbitration module 304 may output the predicted torque and immediate torque to a hybrid optimization module 312. The hybrid optimization module 312 determines how much torque should be produced by the engine and how much torque should be produced by the electric motor 198. The hybrid optimization module 312 then outputs modified predicted and immediate torque values to the propulsion torque arbitration module 308. In various implementations, the hybrid optimization module 312 may be implemented in the hybrid control module 196.

The propulsion torque arbitration module 308 arbitrates between the predicted and immediate torque and propulsion torque requests. Propulsion torque requests may include torque reductions for engine over-speed protection and torque increases for stall prevention.

An actuation mode module 314 receives the predicted torque and the immediate torque from the propulsion torque arbitration module 308. Based upon a mode setting, the actuation mode module 314 determines how the predicted and immediate torques will be achieved. For example, changing the throttle valve 102 allows for a wide range of torque control. However, opening and closing the throttle valve 102 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 110 changes.

According to the present disclosure, the throttle valve 102 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation mode module 314 takes in meeting the immediate torque request is determined by a mode setting. The mode setting provided to the actuation mode module 314 may include an inactive mode, a pleasible mode, a maximum range mode, and an auto actuation mode.

In the inactive mode, the actuation mode module 314 may ignore the immediate torque request. For example, the actuation mode module 314 may output the predicted torque to a predicted torque control module 316. The predicted torque control module 316 converts the predicted torque to desired actuator positions for slow actuators. For example, the predicted torque control module 316 may control desired manifold absolute pressure (MAP), desired throttle area, and/or desired air per cylinder (APC).

An immediate torque control module 320 determines desired actuator positions for fast actuators, such as desired spark advance. The actuation mode module 314 may instruct the immediate torque control module 320 to set the spark advance to a calibrated value, which achieves the maximum possible torque for a given airflow. In the inactive mode, the immediate torque request does not therefore reduce the amount of torque produced or impact spark advance from calibrated values.

In the pleasible mode, the actuation mode module 314 may attempt to achieve the immediate torque request using only spark retard. This may mean that if the desired torque reduction is greater than the spark reserve capacity (amount of torque reduction achievable by spark retard), the torque reduction will not be achieved. The actuation mode module 314 may therefore output the predicted torque to the predicted torque control module 316 for conversion to a desired throttle area. The actuation mode module 314 may output the immediate torque request to the immediate torque control module 320, which will retard the spark as much as possible to attempt to achieve the immediate torque.

In the maximum range mode, the actuation mode module 314 may instruct the cylinder actuator module 120 to turn off one or more cylinders to achieve the immediate torque request. The actuation mode module 314 may use spark retard for the remainder of the torque reduction by outputting the immediate torque request to the immediate torque control module 320. If there is not enough spark reserve capacity, the actuation mode module 314 may reduce the predicted torque request going to the predicted torque control module 316.

In the auto actuation mode, the actuation mode module 314 may decrease the predicted torque request output to the predicted torque control module 316. The predicted torque may be reduced only so far as is necessary to allow the immediate torque control module 320 to achieve the immediate torque request using spark retard.

The immediate torque control module 320 receives an estimated torque from a torque estimation module 324 and sets spark advance using the spark actuator module 126 to achieve the desired immediate torque. The estimated torque may represent the amount of torque that could immediately be produced by setting the spark advance to a value calibrated to produce the greatest torque. The immediate torque control module 320 can therefore select a spark advance that reduces the estimated torque to the immediate torque.

The predicted torque control module 316 also receives the estimated torque and may receive a measured mass air flow (MAF) signal and an engine revolutions per minute (RPM) signal. The predicted torque control module 316 generates a desired manifold absolute pressure (MAP) signal, which is output to a boost scheduling module 328.

The boost scheduling module 328 uses the desired MAP signal to control the boost actuator module 162. The boost actuator module 162 then controls a turbocharger and/or a supercharger. The predicted torque control module 316 generates a desired area signal, which is output to the throttle actuator module 116. The throttle actuator module 116 then regulates the throttle valve 112 to produce the desired throttle area.

The predicted torque control module 316 generates a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 uses the commanded intake and exhaust cam phaser positions along with the MAF signal to determine the estimated torque. Alternatively, the torque estimation module 324 may use actual or measured phaser positions. Further discussion of torque estimation can be found in commonly assigned U.S. Pat. No. 6,704,638 entitled "Torque Estimator for Engine RPM and Torque Control," the disclosure of which is incorporated herein by reference in its entirety.

Figure 3:
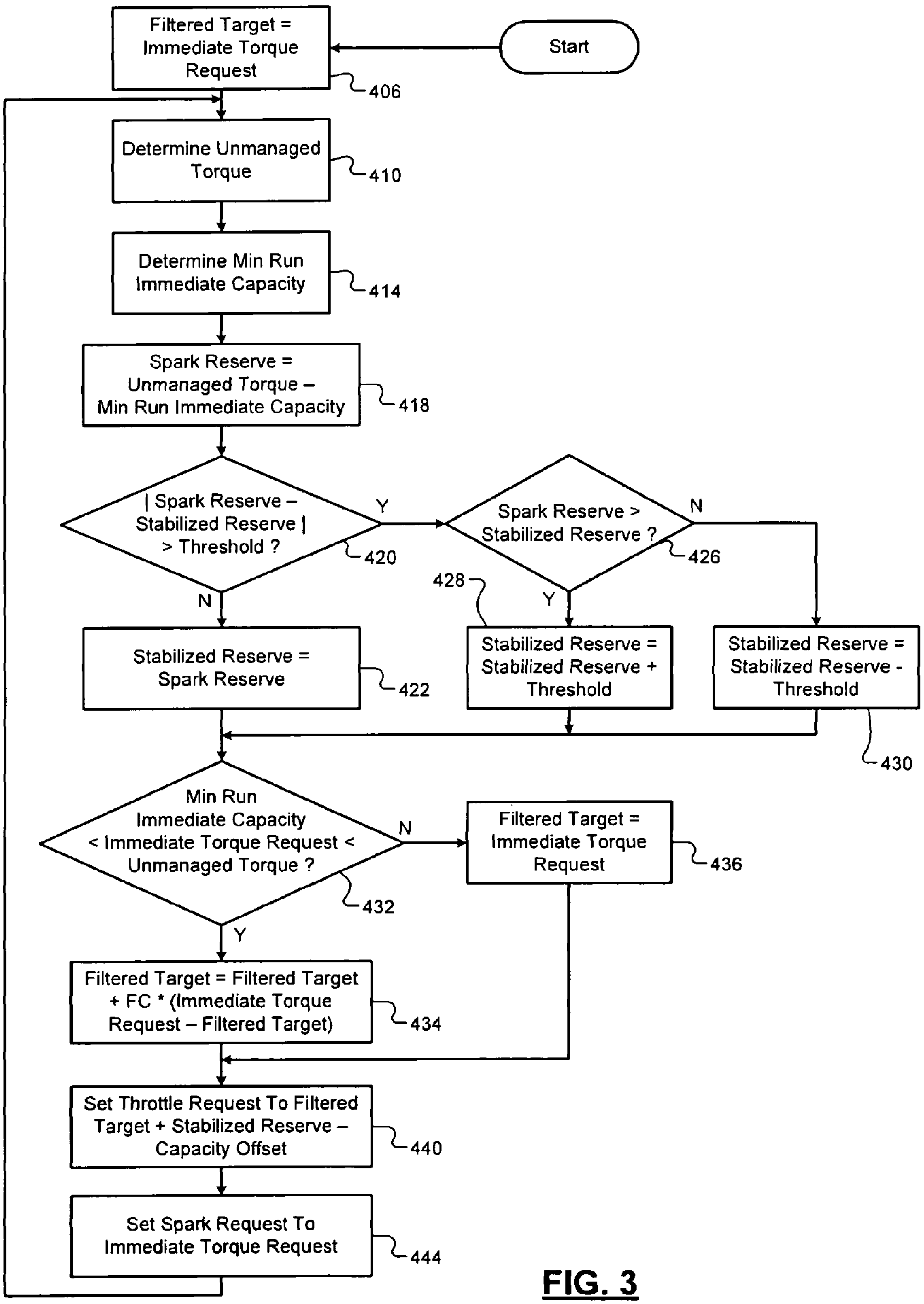
FIG. 3 is a flowchart depicting exemplary steps performed by the actuation determination module for the auto actuation immediate response type according to the principles of the present disclosure.

Referring now to FIG. 3, a flowchart depicts exemplary steps performed by the actuation mode module 314 when the auto actuation mode is selected. Control begins in step 406 when auto actuation mode is selected. In step 406, a filtered target variable is set equal to the immediate torque request. Control continues in step 410, where control determines unmanaged torque of the engine. Unmanaged torque is the torque the engine could produce with the current air per cylinder (APC) and spark advance as calibrated.

The spark advance may be calibrated to achieve as close to mean best torque (MBT) at the current APC as possible while taking into consideration fuel and environmental factors. MBT refers to the maximum torque that occurs as spark advance is increased while using high-octane fuel. The spark advance at which this maximum torque occurs may be referred to as MBT spark.

Control continues in step 414, where min run immediate capacity is determined. The min run immediate capacity is the minimum torque immediately achievable with the engine still running by using spark retard. In various implementations, the min run immediate capacity is determined using a torque model of the engine.

Control continues in step 418, where spark reserve capacity is calculated as the unmanaged torque minus the min run immediate capacity. Control continues in step 420, where control determines whether the spark reserve capacity and a stabilized spark reserve variable differ by more than a threshold value.

The threshold value of step 420 is used to rate limit the spark reserve capacity. The spark reserve capacity may be rate limited to improve control system stability. The throttle area may be determined based on a torque that includes the spark reserve capacity, so the rate limiting can prevent rapid changes in throttle position. Other ways of rate limiting and/or filtering the spark reserve capacity may be implemented. In various implementations, the threshold value is 0.2 Nm.

In step 420, if the absolute value of the difference between the spark reserve capacity and the stabilized spark reserve is greater than the threshold value, control transfers to step 426; otherwise, control transfers to step 422. In various implementations, the first time that step 420 is reached, control may transfer to step 422, where the stabilized spark reserve variable is set to the spark reserve capacity. This is done because the stabilized spark reserve variable has not been initialized the first time that step 420 is reached.

In step 426, if the spark reserve capacity is greater than the stabilized spark reserve, control transfers to step 428; otherwise, control transfers to step 430. In step 428, the stabilized reserve capacity is increased by the amount of the threshold value, and control continues in step 432. In step 430, the stabilized spark reserve is decreased by the amount of the threshold value, and control continues in step 432.

In step 422, the stabilized spark reserve is set equal to the spark reserve capacity. Control then continues in step 432. In step 432, control determines whether the immediate torque request is between the min run immediate capacity and the unmanaged torque. If so, control transfers to step 434; if not, control transfers to step 436. In step 436, the immediate torque request cannot be produced with the current throttle area, so the filtered target is set equal to the immediate torque request. Control then continues in step 440.

In step 434, the filtered torque target is set to the previous filtered torque target plus the difference between the immediate torque request and the previous filtered torque target times a filter coefficient. In various implementations, the filter coefficient is 0.1. This function represents a first-order lag filter, although other suitable filter types may be used.

The immediate torque request is filtered in this way to prevent small variations in the immediate torque request from causing fluctuation of the throttle valve 102. Control then continues in step 440, where the throttle request for the predicted torque control module 316 is set to the filtered torque target plus the stabilized reserve capacity minus a calibratable capacity offset.

In various implementations, the throttle torque request is reduced by the capacity offset, so that if the immediate torque request is reduced slightly, it can be met with further spark retard. Without the capacity offset, a small decrease in immediate torque request would produce a change in throttle area.

Figure 4:
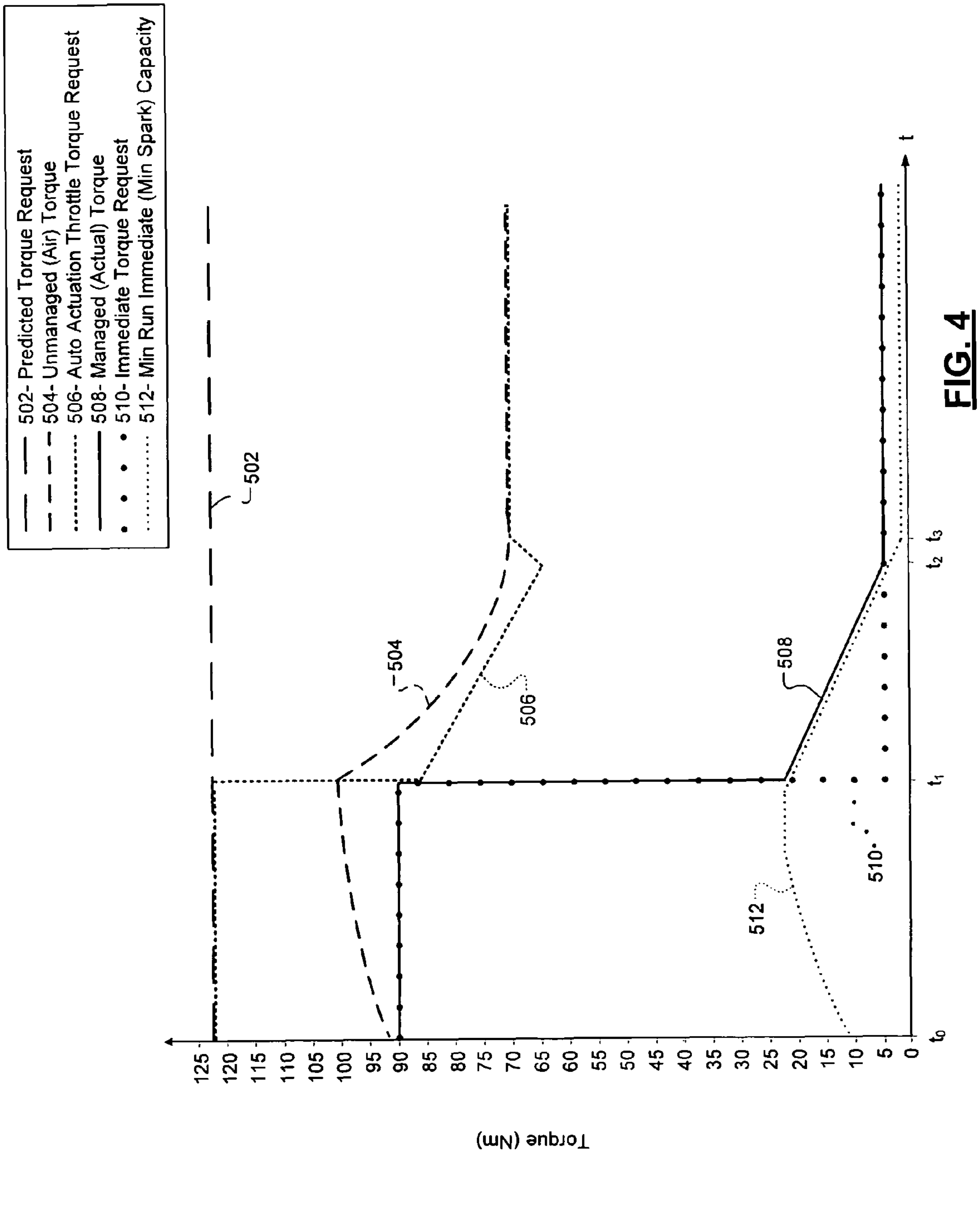
FIG. 4 is a graphical plot of exemplary torques and torque requests according to the principles of the present disclosure.

Control continues in step 444, where the spark torque request for the spark actuator module 126 is set to the immediate torque request. Control then returns to step 410. In various implementations, the steps performed in FIG. 4 are performed as part of an engine control loop. Control may therefore return to step 410 from step 444 according to a predetermined control loop, such as a 12.5 millisecond control loop.

Referring now to FIG. 4, a graphical plot of exemplary estimated, requested, and actual torques is presented. The plot of FIG. 4 includes traces for predicted torque request 502, unmanaged torque 504, auto actuation throttle torque request 506, managed torque 508, immediate torque request 510, and min run immediate capacity 512.

The predicted torque request 502 remains approximately constant at 123 Nm. At time $t_0$, the auto actuation throttle torque request 506 is also approximately 123 Nm. The unmanaged torque 504 is shown gradually approaching the predicted torque request 502. The min run immediate capacity 512 tracks the unmanaged torque 504. At time $t_0$, the immediate torque request 510 is approximately 90 Nm. The engine can quickly transition from the immediate torque request 510 to the unmanaged torque 504 by instructing full spark advance (using calibrated spark advance values). The engine can also quickly transition from the immediate torque request 510 to the min run immediate capacity 512 by fully retarding the spark advance.

At time t1, the immediate torque request 510 decreases to approximately 5 Nm. The immediate torque request 510 is now below the min run immediate capacity. The immediate torque request 510 cannot therefore be met only by retarding spark. Control responds by decreasing the auto actuation throttle torque request 506. The auto actuation throttle torque request 506 is reduced from the current unmanaged torque 504 by the amount that the immediate torque request 510 falls below the min run immediate capacity 512.

The spark reserve capacity (the difference between the unmanaged torque 504 and the min run immediate capacity 512) gets smaller as the unmanaged torque 504 decreases. Therefore, if this reduction has not been modeled, the auto actuation throttle torque request 506 must reduce further to account for the reduced spark reserve capacity. The reduction in spark reserve capacity may be rate limited. The linear angled section of the auto actuation throttle torque request 506 between $t_1$ and $t_2$ corresponds to the period when the spark reserve capacity is rate limited. The auto actuation throttle torque request 506 tracks downward based on the rate limit.

At time $t_3$, the auto actuation throttle torque request 506 stabilizes at a value where the min run immediate capacity 512 is at a calibratable offset below the immediate torque request 510. The managed torque 508 is then maintained at the immediate torque request 510. If the immediate torque request 510 were decreased slightly, the managed torque 508 could be reduced through spark retard down to the min run immediate capacity 512.

In addition, if the min run immediate capacity 512 fluctuates slightly, the managed torque 508 can be held constant at the immediate torque request 510. This allows small variations in the min run immediate capacity 512 and/or the immediate torque request 510 to be accommodated without changing the auto actuation throttle torque request 506. Excessive fluctuation of the throttle valve 112 is therefore avoided.

Once the torque requester that has caused the immediate torque request 510 to decrease to 5 Nm withdraws its request, the immediate torque request 510 can return to 90 Nm. The auto actuation throttle torque request 506 may therefore return to 123 Nm. The unmanaged torque 504 will then begin climbing toward the auto actuation throttle torque request 506.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An engine control system comprising:

a torque request module that generates an expected torque request and an immediate torque request;

an immediate torque control module that controls a spark advance of an engine based on said immediate torque request;

an actuation module that selectively reduces said expected torque request based on said immediate torque request and a spark capacity, wherein said spark capacity is based on a difference between a first engine torque and a second engine torque, determined at a current airflow, and wherein said first engine torque is determined at a first spark advance and said second engine torque is determined at a second spark advance that is less than said first spark advance; and an expected torque control module that controls a throttle valve area based on said expected torque request.

2. The engine control system of claim 1 wherein said actuation module reduces said expected torque request when said immediate torque request is less than said second engine torque.

3. The engine control system of claim 1 wherein said actuation module reduces said expected torque request to a value based on a sum of said immediate torque request and said spark reserve capacity.

4. The engine control system of claim 1 wherein said actuation module reduces said expected torque request to a value based on a sum of said immediate torque request, said spark reserve capacity, and a predetermined negative offset.

5. The engine control system of claim 1 wherein said actuation module updates said expected torque request based on changes in said spark capacity.

6. The engine control system of claim 5 wherein said actuation module updates said expected torque request based on a stabilized capacity based on said spark capacity.

7. The engine control system of claim 6 wherein said stabilized capacity is determined by rate limiting said spark capacity.

8. The engine control system of claim 1 wherein said actuation module reduces said expected torque request to a value based on a sum of said spark reserve capacity and a filtered torque target, wherein said filtered torque target is based on said immediate torque request.

9. The engine control system of claim 8 wherein said filtered torque target is determined by low-pass filtering said immediate torque request.

10. The engine control system of claim 9 wherein said filtered torque target is set equal to said immediate torque request when said immediate torque request is at least one of greater than said first engine torque and less than said second engine torque.

11. A method of controlling an engine control system, comprising:

generating an expected torque request and an immediate torque request;

controlling a spark advance of an engine based on said immediate torque request;

determining first and second engine torques at a current airflow level, wherein said first engine torque is determined at a first spark advance and said second engine torque is determined at a second spark advance that is less than said first spark advance;

determining a spark capacity based on a difference between said first and second engine torques;

selectively reducing said expected torque request based on said immediate torque request and said spark capacity; and controlling a throttle valve area based on said expected torque request.

12. The method of claim 11 further comprising reducing said expected torque request when said immediate torque request is less than said second engine torque.

13. The method of claim 11 further comprising reducing said expected torque request to a value based on a sum of said immediate torque request and said spark reserve capacity.

14. The method of claim 11 further comprising reducing said expected torque request to a value based on a sum of said immediate torque request, said spark reserve capacity, and a predetermined negative offset.

15. The method of claim 11 further comprising updating said expected torque request based on changes in said spark capacity.

16. The method of claim 15 further comprising updating said expected torque request based on a stabilized capacity based on said spark capacity.

17. The method of claim 16 further comprising determining said stabilized capacity by rate limiting said spark capacity.

18. The method of claim 11 further comprising:

determining a filtered torque target is based on said immediate torque request; and reducing said expected torque request to a value based on a sum of said spark reserve capacity and said filtered torque target.

19. The method of claim 18 further comprising determining said filtered torque target by low-pass filtering said immediate torque request.

20. The method of claim 19 further comprising setting said filtered torque target equal to said immediate torque request when said immediate torque request is at least one of greater than said first engine torque and less than said second engine torque.

* * * * *